(12) United States Patent
Namuduri et al.

(10) Patent No.: US 7,009,365 B1
(45) Date of Patent: Mar. 7, 2006

(54) SYSTEMS AND METHODS FOR CONTROL OF VEHICLE ELECTRICAL GENERATOR

(75) Inventors: Chandra S. Namuduri, Troy, MI (US); Nick S. Kapsokavathis, Shelby Township, MI (US); Toufic M. Huazi, Troy, MI (US); Kenneth J Shoemaker, Highland, MI (US); David W. Walters, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/931,464

(22) Filed: Aug. 31, 2004

(51) Int. Cl.
*H02P 7/36* (2006.01)

(52) U.S. Cl. .............................. 322/23; 322/28; 322/29; 322/25; 322/27; 322/8; 322/73; 322/314

(58) Field of Classification Search ................ 322/23, 322/28, 29, 25, 27, 8, 17, 22, 73; 323/314, 323/258
See application file for complete search history.

(56) References Cited

U.S. PATENT DOCUMENTS

| | | | | |
|---|---|---|---|---|
| 3,622,960 A | * | 11/1971 | Barron | 340/3 R |
| 3,858,108 A | * | 12/1974 | Bray | 322/28 |
| 5,225,764 A | * | 7/1993 | Falater | 322/28 |
| 5,325,043 A | * | 6/1994 | Parro | 322/23 |
| 5,602,462 A | * | 2/1997 | Stich et al. | 323/258 |
| 6,859,156 B1 | * | 2/2005 | May et al. | 341/144 |

* cited by examiner

*Primary Examiner*—Darren Schuberg
*Assistant Examiner*—Iraj A. Mohandesi
(74) *Attorney, Agent, or Firm*—Laura C. Hargitt

(57) ABSTRACT

Systems, methods and devices are described for controlling a vehicle electrical generator. A regulator for controlling a generator in response to an input signal received from a control module suitably includes a discriminator module, a processing module and a switching circuit. The discriminator determines whether the regulator is operating in voltage or torque control mode. If the input signal is a voltage control, the output generator produces a modulation signal to produce a desired voltage between two battery terminals. If the input signal is a torque control, the output generator produces one or more modulation signals (e.g. pulse width modulation signals) to control the torque of the generator. The modulation signals are applied across a field coil or other controllable element of the generator by a switching circuit that applies positive and/or negative voltage from the battery terminals as appropriate.

13 Claims, 4 Drawing Sheets

SYSTEMS AND METHODS FOR CONTROL OF VEHICLE ELECTRICAL GENERATOR

TECHNICAL FIELD

The present invention generally relates to multi-mode control of a vehicle electrical generator, and more particularly relates to generator systems and methods for operating in multiple modes in response to one or more control inputs.

BACKGROUND

Conventional automobiles and other vehicles include numerous electrical components such motors, lights, gauges and such accessories as power windows, power locks, audio systems and the like. Typically, such components derive electrical power from a vehicle electrical system that includes a battery and an alternator. The battery typically provides electrical power while the engine is off and/or is being started; the alternator generally converts mechanical energy from the vehicle's engine to electrical energy that can be used to drive various electrical components while the vehicle is running. The alternator also recharges the battery during engine operation as appropriate.

The electrical system typically also includes a "regulator" that controls the voltage generated by the alternator. Generally, an engine control module (ECM) or other vehicle control device provides a signal to the regulator that indicates a desired output voltage. Regulator circuitry is commonly "built in" to many modern alternators such that the alternator and regulator components are provided within a common housing.

As the electrical demands upon the electrical system continue to increase, however, it is desirable to provide a generator assembly that is increasingly flexible and capable. In particular, it is desirable to produce a vehicle generator assembly that is capable of quickly responding to stalls or other engine operating conditions. Further, it is desirable to control the torque load placed on the engine by the generator assembly to further improve engine performance and fuel economy. Furthermore, other desirable features and characteristics will become apparent from the subsequent detailed description and the appended claims, taken in conjunction with the accompanying drawings and the foregoing technical field and background.

BRIEF SUMMARY

Systems, methods and devices are described for controlling a vehicle electrical generator. According to various exemplary embodiments, a regulator for controlling a generator in response to an input signal received from a control module suitably includes a discriminator module, a processing module and a switching circuit. The discriminator determines whether the regulator is operating in voltage or torque control mode. If the input signal indicates a voltage control operating mode, the output generator produces a modulation signal to achieve a desired voltage between the battery terminals (e.g. B+ and B−). If the input signal is a torque control, the output generator produces one or more modulation signals (e.g. pulse width modulation signals) to control the torque of the generator. The modulation signals are applied across a field coil or other controllable element of the generator by a switching circuit that applies positive and/or negative voltage from the battery terminals as appropriate. In various further embodiments, a "fast torque control" may be implemented by, for example, configuring the chopper circuit to modulate the controllable element using voltages of opposing polarities. By directly controlling the torque of the generator, benefits realized in various exemplary embodiments may include improved engine performance, improved recovery from engine stalls, reduced fuel consumption, improved idle quality, improved vehicle emissions and/or other benefits.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a generator assembly that includes a regulator and an alternator is operable in either a voltage control or a torque control mode. When the generator is in the torque control mode, the torque load placed on the engine due to the electrical load of the generator is suitably controlled in response to a control signal provided by an engine control module or other controller. Moreover, the regulator may include switching circuitry that allows either positive or negative voltage to be switchably applied across a controllable element of the alternator, thereby allowing for rapid reduction of torque as appropriate. In various further embodiments, the regulator includes one or more discriminator modules that sense the desired operating mode of the generator in response to a frequency of the signal input from the controller, the operating speed of the alternator, and/or any other appropriate factors. The torque control mode may be used to rapidly decrease torque loads on the engine in the event of a stall, for example, and/or may be used to improve engine performance, reduce emissions, improve fuel economy and/or the like.

Figure 1:
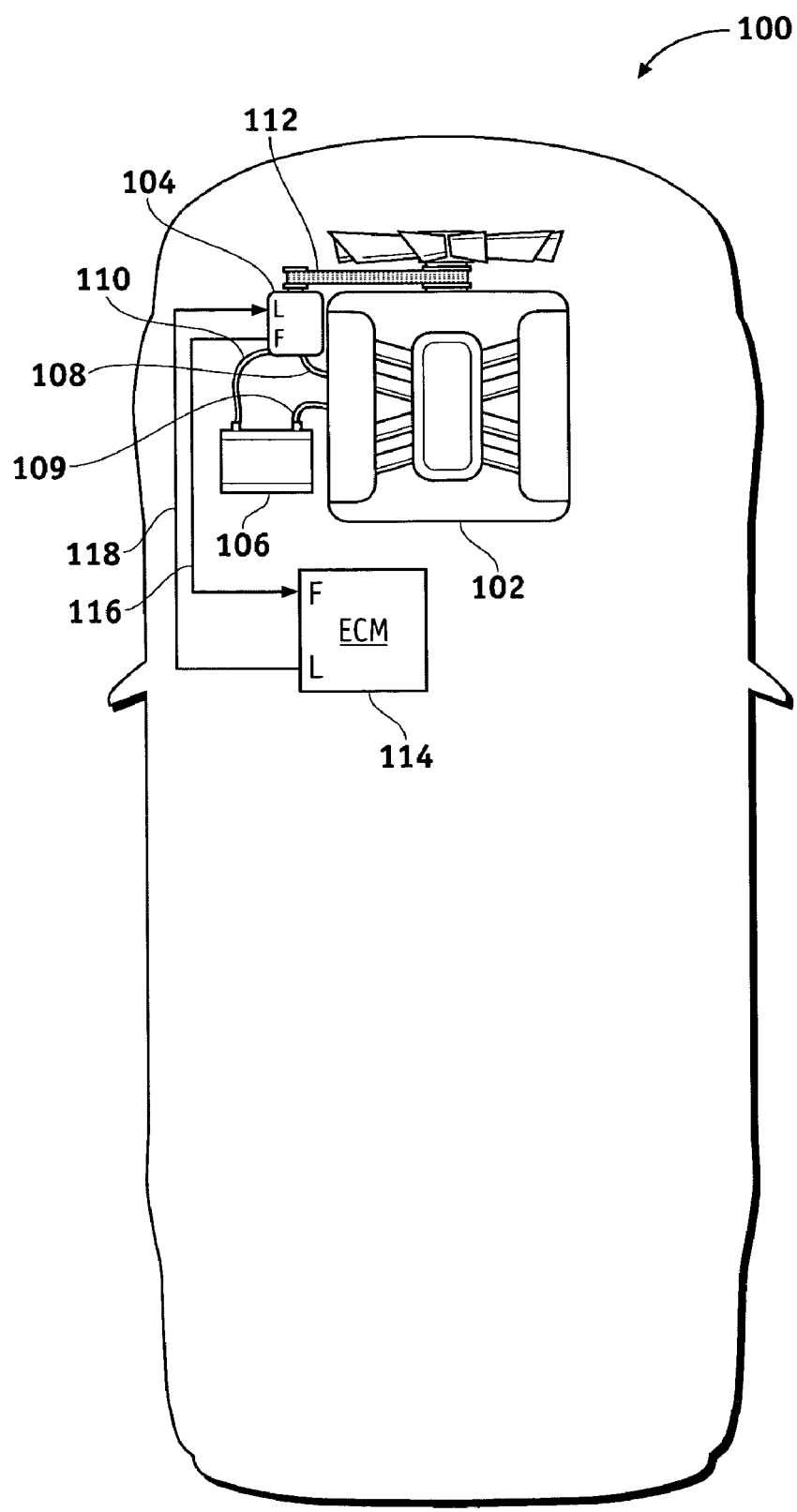
FIG. 1 is a block diagram of an exemplary vehicle.

With initial reference to FIG. 1, an exemplary vehicle 100 suitably includes an engine 102 and an electrical system that includes a battery 106 and a generator assembly 104. Generator assembly 104 is mechanically coupled to engine 102 via a belt 112, chain or other coupling that facilitates transmission of rotational energy from the engine to the electrical system for generating electrical energy. Generator assembly 104 also receives a control signal (L) 118 from an engine control module (ECM) or other controller, and as described more fully below. Generator assembly 104 may also provide an optional feedback signal (F) 116 to ECM 114 as appropriate. Signals 116 and 118 may be transmitted and received in any manner across any number of serial and/or parallel data channels using any digital, analog, optical or other communications protocol as appropriate.

The term "generator assembly" as used herein is intended to broadly encompass any device or component that converts mechanical energy to electrical energy usable by battery 106 and/or any other electrical components within vehicle 100. Accordingly, generator assembly 104 may include any type of generator, alternator and/or other circuitry as appropriate. In an exemplary embodiment, generator assembly 104 suitably includes an alternator as well as a regulator circuit and a converter such as a rectifier circuit capable of converting alternating current (AC) produced by the alternator to an appropriate direct current (DC) typically used by battery 106 and other vehicle components. Other embodiments may include a DC generator in place of or in addition to an alternator, thereby reducing or eliminating the need for separate AC-to-DC conversion. Various exemplary generator assemblies 104 are described in connection with FIGS. 2 and 3 below.

Generator assembly 104 and battery 106 each include at least two electrical terminals as appropriate. These terminals are typically interconnected to allow generator assembly 104 to recharge battery 106 during operation of engine 102. FIG. 1 shows the positive terminals (B+) interconnected by signal line 110 and negative terminals (B−) 108, 109 each connected to the engine 102 or another object representing an electrical ground. In alternate embodiments, the negative terminals of generator assembly 104 and battery 106 may be interconnected. Indeed, the various components and terminals shown in FIG. 1 may be electrically or mechanically arranged in any manner, as will vary from embodiment to embodiment.

In operation, then, generator assembly 104 suitably produces an electrical output that can typically be represented as a DC signal between two nodes 108 and 110. Because this electrical energy is produced from mechanical energy received from engine 102 via belt 112, generator assembly 104 suitably places a torque load upon engine 102 that is dependent upon the electrical load placed upon the generator. More particularly, the torque load produced by the generator assembly is a function of the DC output voltage, the rotational speed and the current output of the generator. Similarly, the generator output current is typically dependent upon the battery voltage applied across the generator as well as the speed of the generator and the amount of excitation field current present in the generator.

Because the torque load of the generator is at least partially dependent upon the field current of the generator, variations in the field current can be used to control the torque load of generator assembly 104. In practice, however, changing the field current with a conventional voltage control signal provided by a typical controller can be inordinately slow due to the large leakage time constants of many conventional alternators. Various embodiments therefore place the generator assembly into a "torque control mode" that is capable of processing torque/current control signals in a manner apart from the conventional voltage control signals typically provided from ECM 114 to generator assembly 104.

Figure 2:
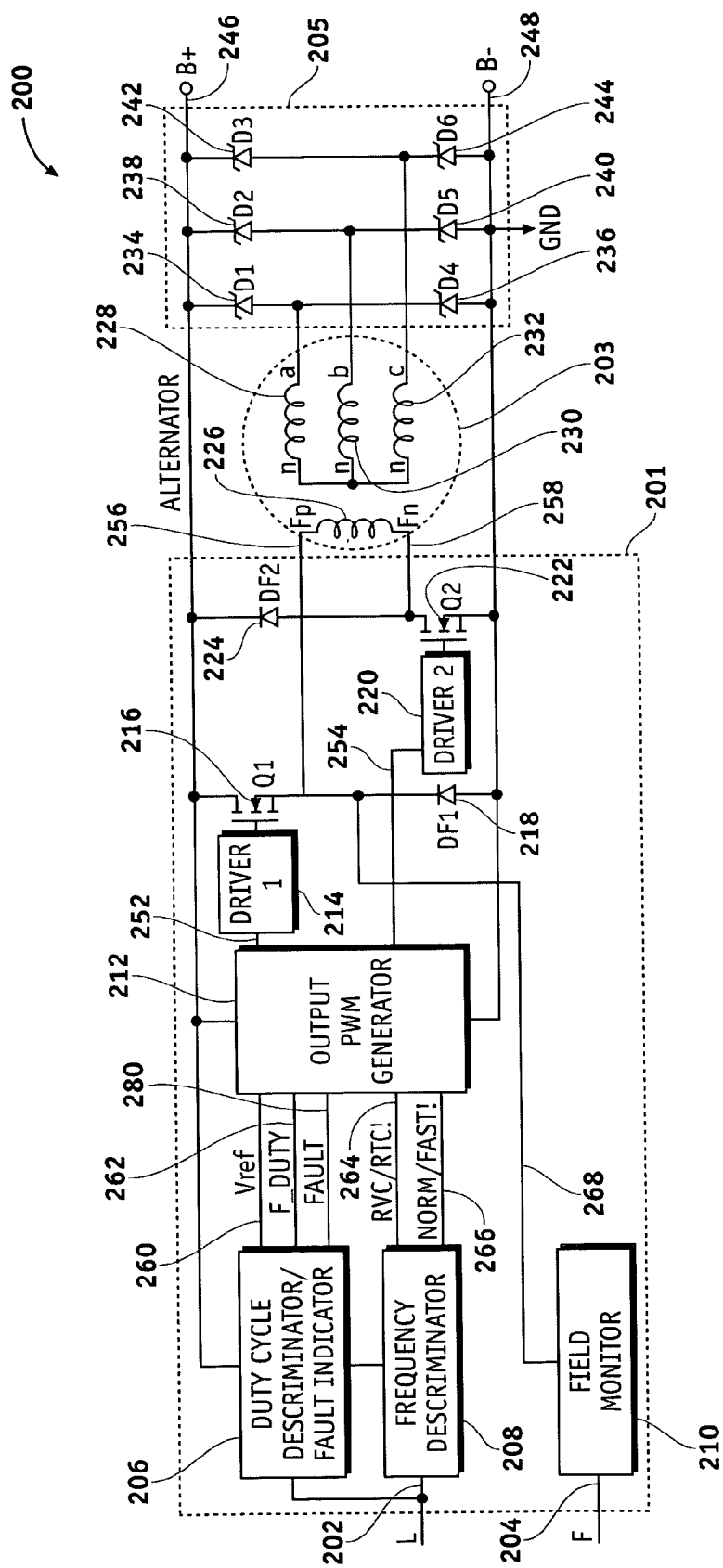
FIG. 2 is a block diagram of an exemplary vehicle electrical generator with a multi-mode regulator.

With reference now to FIG. 2, an exemplary generator assembly 200 suitably includes a regulator module 201, an alternator 203 and a rectifier circuit 205. In the embodiment shown in FIG. 2, generator assembly processes an input signal 202 received from a controller (e.g. ECM 114 in FIG. 1) to produce one or more modulation signals 252, 254 which can be used to appropriately apply the battery voltages 246, 248 across a controllable element 226 of alternator 203. Generator assembly 200 generally corresponds to generator assembly 104 shown in FIG. 1.

Regulator module 201 (also referred to as simply "regulator" 201) is any circuit, processing module, logic or the like capable of regulating one or more parameters or components of alternator 203. As shown in FIG. 2, regulator module suitably includes one or more discriminator modules 206/208, a processing module 212 and additional switching circuitry (e.g. transistors 216, 222 and diodes 224, 218) as appropriate. In various embodiments, regulator module 201 is implemented with a combination of discrete components and a digital processor, although other embodiments may be implemented with any discrete and/or integrated components, with a microcontroller or with any other hardware and/or software components used alone or in combination. Discriminator modules 206 and 208, for example, may be physically combined with processing module 212 in a common chip or circuit in various alternate embodiments, and need not be implemented as separate hardware components.

Alternator 203 is any device capable of controllably providing a desired electrical output. In various embodiments, alternator 203 is any conventional Lundell machine or other vehicle alternator having any number of electrical phases. As mentioned below, alternate embodiments may not include an alternator 203 at all, but may equivalently provide a DC generator, electric motor or other device that is capable of receiving modulation signals from regulator 201. As shown in FIG. 2, however, alternator 203 is a conventional Lundell machine having a field coil 226 as a controllable element and three electrical phases 228, 230, 232.

Rectifier 205 is any circuit capable of shaping or modifying the output of alternator 203 to produce a direct current output between two terminals 246, 248. FIG. 2 shows rectifier 205 as a conventional diode rectifier having three electrical phases corresponding to the three phases of alternator 203. Each phase is shown with a pair of diodes 234 and 236, 238 and 240, 242 and 244 separating the alternator phases from the battery voltage terminals 246, 248 as appropriate. As discussed below, rectifier 205 may not be required in all embodiments, particularly when alternator 203 is equivalently implemented with a direct current generator, and therefore has no need for AC-to-DC conversion.

Input signal 202 is any digital or analog signal provided to regulator 201 by an external controller such as ECM 114 (FIG. 1). In an exemplary embodiment, input signal 202 is a signal that represents either a desired voltage to be applied at the output of generator module 200 or a torque control to be applied across field coil 226 to reduce the torque load of the generator. Input signals 202 may be provided to generator assembly 200 in any manner. In various embodiments, signals 202 are provided via the "L" channel 118 described above, with voltage and torque controls being provided on a common channel. Torque and voltage control signals may be differentiated from each other in any manner, such as through any difference in phase, frequency or magnitude, as described more fully below.

Although either or both of the voltage and torque control signals could be represented in any manner, an exemplary embodiment represents the voltage control as a pulse-width modulated (PWM) signal having a duty cycle that indicates the desired voltage. Duty cycle variation, for example, could be used to represent the operating voltages between desired minimum or maximum limits. In one embodiment, duty cycles varying between about 10–90% could be used to represent voltages across a range of about 11–15.5 volts, for example, with duty cycles outside 10–90% being interpreted as a default or other mode. In an exemplary default mode, the output voltage generator module 200 is set to a predetermined value corresponding to an internal reference voltage (e.g. a voltage of about 13.8 volts or so). Similarly, torque control signals could be represented in any manner. In an exemplary embodiment, the external controller computes desired modulation signals to be applied to the controllable element 226 of alternator 203, and produces PWM input signals 202 having duty cycles that are at least approximately equal to the duty cycles of the modulation signals applied, as described more fully below. Again, other embodiments may have widely varying operating parameters and signaling schemes.

Controller 201 suitably determines whether the input signals 202 are voltage or torque controls using any appropriate technique. Such processing may be accomplished, for example, with an appropriate discriminator module 208 that receives the input signals 202, determines whether the signals correspond to voltage or torque controls, and provides an appropriate output signal 264 to processing module 212 to indicate the "operating mode" of regulator 201. Discriminator module 208 may also identify one or more "sub-modes" 266 in various further embodiments. Such modes may correspond to "fast" or "normal" torque control modes, for example, or any other mode information that may be extracted from input signals 202.

In an exemplary embodiment, ECM 114 suitably differentiates torque control signals from voltage control signals by assigning different frequencies to the two types of signals. Further, signals 202 representing a "fast" torque control mode may be assigned to a third transmit frequency. Normal regulated voltage control (RVC) signals, for example, could be assigned a first frequency (e.g. 128 Hz or so), with normal mode regulated torque control (RTC) signals assigned a second frequency (e.g. 64 Hz or so) and "fast" RTC signals assigned a third frequency (e.g. 256 Hz or so). In such embodiments, discriminator 208 is a frequency discriminator capable of discerning the frequency of incoming input signals 202 and of providing corresponding output signals 264, 266 to indicate the type of signals received to processing module 212. The exemplary frequencies described herein are chosen somewhat arbitrarily; alternate embodiments may represent the various operating modes with any combinations of harmonic or non-harmonic frequencies, or indeed may use other differentiation schemes entirely, as discussed more fully below.

A second discriminator module 206 suitably receives input signals 202 and provides decoding functionality as appropriate. When input signals 202 represent RVC instructions, for example, discriminator module 206 suitably determines the desired voltage (Vref) 260 from the duty cycles of the PWM input signal 202. When input signals 202 are provided in RTC mode, discriminator module 206 may similarly process signals 202 to directly determine the duty cycle (F_duty) 262 of the modulation signals 252, 254 as appropriate. In various further embodiments, discriminator module 206 is further configured to provide a fault indication to the external controller in response to a fault signal 280 received from processing module 212. This signal may represent a fault observed in alternator 203, for example, or any other issue with generator assembly 200 that is of interest to the external controller. Fault signals may be transmitted in any manner; in various embodiments, module 206 simply connects signal line "L" (line 118 in FIG. 1) to a reference voltage (e.g. ground) until the fault is removed, regulator 201 is reset, a period of time elapses or another appropriate condition is met. In alternate embodiments, fault data is provided by module 210 via signal line 204, as described below. In still other embodiments, fault reporting to the external controller is omitted completely, or implemented in any other manner.

Processing module 212 is any circuit, module, logic routine or the like capable of producing one or more modulation signals 252, 254 based upon information contained in input signals 202. Although processing module 212 may not receive input signals 202 directly in all embodiments, module 212 suitably receives data 264, 266 from module 208 about the type of information contained within input signals 202, and/or receives duty cycle or other encoded data via module 206. This information is processed in any manner that is appropriate for the embodiment and the type of data received. In various embodiments, processing module 212 processes input signal data with a different routine depending on whether the signal provides RVC or RTC information. If input signals 202 indicate RVC control mode, for example, processing module 212 suitably computes appropriate modulation signals 252, 254 based upon the desired reference voltage (Vref) 260 and the current generator voltage observed between terminals 246 and 248. Appropriate modulation signals may be obtained from a lookup table contained within module 212, for example, or may be computed using any suitable algorithm and/or appropriate control and feedback techniques. In still other embodiments, modulation signals 252, 254 are processed with discrete or integrated circuitry.

If input signals 202 are identified as RTC controls, however, processing module 212 suitably processes the data in a different manner from that used for RVC controls. In various embodiments, RTC controls are simply modulated instructions from the ECM or other external controller that provide a duty cycle to be applied to PWM modulation signals provided by processing module 212. In such cases, processing module 212 need simply determine the duty cycle of the input signals and produce modulation signals having the same duty cycle at the appropriate modulation frequency. Processing module 212 may determine the input duty cycle directly, or may receive an indication 262 of the duty cycle from module 206, as appropriate. Other RTC signals may be encoded and/or processed in any other manner as appropriate.

Modulation signals 252, 254 signals applied to one or more elements in the switching circuitry to properly control any portion of alternator 203 to produce the desired output. In various embodiments, modulation signals 252, 254 are PWM signals that are applied to the gate terminals of one or more transistors, relays, switches or other appropriate devices to modulate the controllable element 226 of alternator 203 as desired. In such embodiments, the switching elements remain activated throughout the duration of the duty cycle, and otherwise inactive. Accordingly, the amount of time that one or more switching elements remains in a particular state can be controlled by varying the duty cycle of modulation signals 252, 254.

The exemplary embodiment of switching circuitry shown in FIG. 2 employs a conventional two-quadrant chopper circuit that includes two MOSFET transistors 216, 218 that selectively couple one side 256, 258 of the alternator field coil 226 to a high or low battery voltage 246, 248 respectively. Each of the transistors 216, 218 is activated by applying one of the modulation signals 252, 254 to the transistor gate as appropriate. When transistors 216, 222 are turned "on" by modulation signals 252, 254, terminal 256 of field coil 226 is connected to battery terminal 246 (B+), and terminal 258 of field coil 226 is connected to battery terminal 248 (B−). When transistor 216 is turned off, terminal 256 of field coil 226 gets connected to battery terminal 248 (B−) via freewheeling diode 218. Similarly, when transistor 222 is turned off, terminal 258 of field coil 226 gets connected to battery terminal 246 via diode 224. Accordingly, by applying proper modulation signals 252, 254 to the gates of transistors 216, 222, the battery voltages coupled to each side of field coil 226 can be controlled as desired.

Various modulation and switching schemes could be formulated in a wide array of alternate embodiments. In various embodiments, either transistor 216, 222 is kept in a relatively constant "on" state during normal operation and the other transistor is modulated as desired. Whether transistor 216 or transistor 22 is kept active in the arrangement shown in FIG. 2, voltage differences only exist across field coil 226 when both transistors are active. For a faster control, however, both transistors 216, 222 may be modulated at the same time to produce voltages having opposite polarities across field coil 226 when the transistors are "on" or "off". That is, the polarity of the voltage applied across field coil 226 is reversed when the transistors 216, 222 are activated or deactivated in tandem. This "reverse" voltage effectively enables faster decay of field current, thereby resulting in faster torque or voltage reductions as appropriate. Accordingly, using the two quadrant chopper circuit shown in FIG. 2, "normal" voltage or torque control modes may be implemented by maintaining one modulation signal in a relatively constant active state while modulating the other signal. "Fast" control modes may be implemented by simultaneously modulating both sides of controllable element 226.

Again, many modifications could be made to the circuitry shown in FIG. 2 in a wide array of equivalent embodiments. Modulation signals 252, 254 need not be applied directly to transistors 216, 220, for example, but rather may be applied to a driver circuit 214, 220 as shown. Such driver circuits are any conventional bias circuits capable of placing and maintaining transistors 216, 222 into saturation mode for the duration of the duty cycle in modulation signals 252, 254, respectively. Further, the N-channel enhancement mode MOSFETs shown in FIG. 2 could be replaced with any type of FET, MOSFET, bipolar or other transistor, or any other type of switch or relay. Diodes 218 and 224 could similarly be implemented using transistors or other uni-directionally conducting components or circuits. Further, some or all of the switching circuitry could be implemented with integrated circuitry (which may be further integrated with processor 212 and/or modules 206, 208 as well). Accordingly, many different circuit arrangements could be used to implement the features described above.

In various embodiments, regulator 201 further includes an optional field monitor module 210 for providing feedback data to ECM 114 (FIG. 1) or another recipient for diagnostic or control purposes as appropriate. As shown in FIG. 2, field monitor module 210 suitably receives an indication 268 of the voltage applied across the field winding 226 of alternator 203. This voltage 268 can be used to measure the responsiveness of regulator 201, to obtain a rough measurement of the torque load produced by alternator 203, or for any other purposes. Feedback data may be provided to ECM 114 via signal line 116 (FIG. 1).

Figure 3:
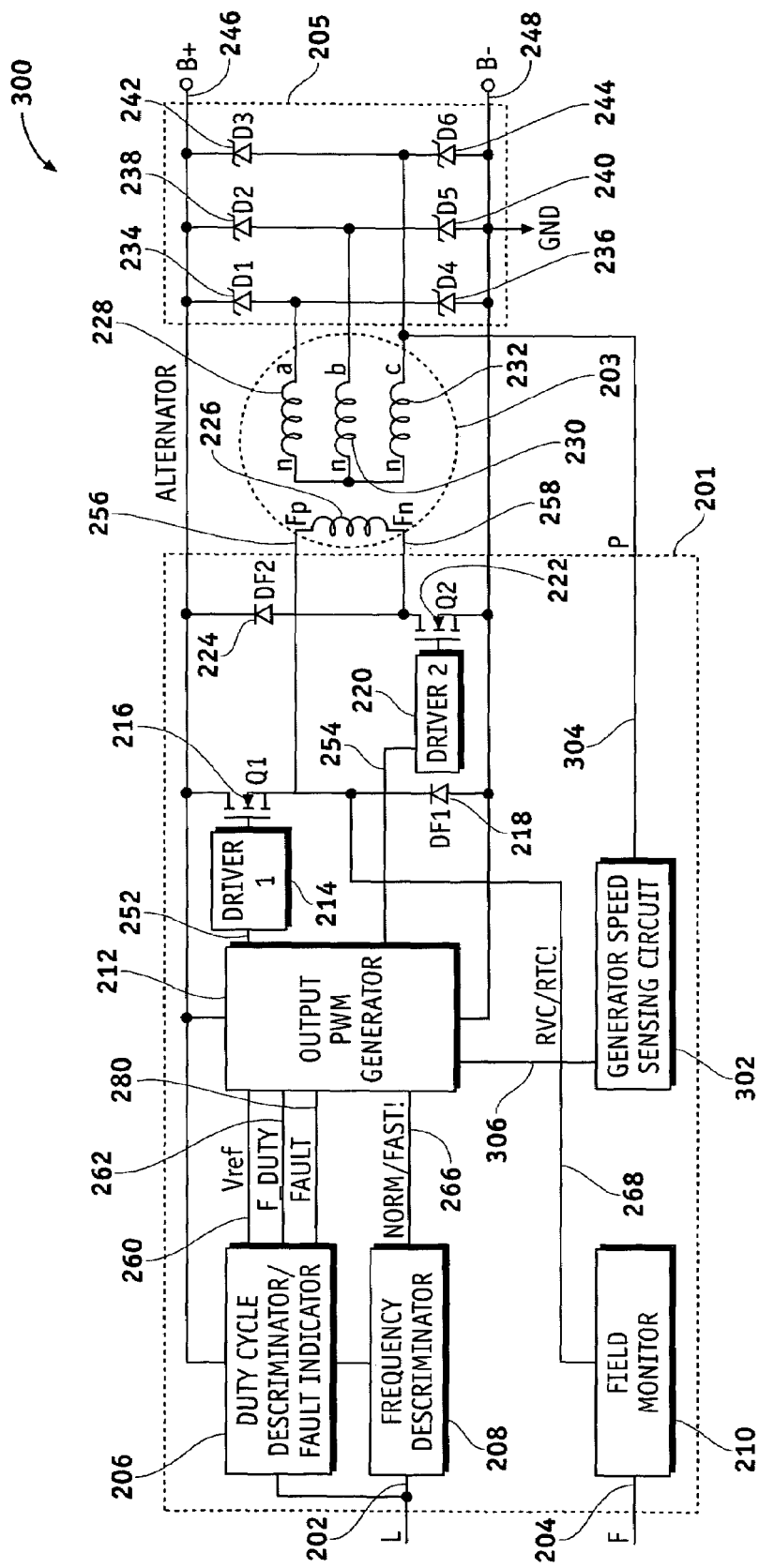
FIG. 3 is a block diagram of an alternate embodiment of an exemplary vehicle electrical generator with a multi-mode regulator.

With reference now to FIG. 3, an alternate embodiment of a generator assembly 300 suitably includes a generator speed sensing circuit 302 in place of or in addition to frequency discriminator 208. In various embodiments, torque control may be most beneficial at low engine speeds, when torque loads are typically of greatest concern. Accordingly, selection between torque and voltage control modes may be made based upon the engine and/or alternator speed rather than upon the frequency or other characteristics of incoming input signals 202. Input signals 202 received when the alternator speed is relatively low (e.g. less than about 2000 rpm or so), could be readily assumed to be torque control signals, for example, whereas input signals 202 received at higher speeds can be assumed to be voltage controls. By determining the frequency of the alternator rotation (which is related to the engine rotation speed by a pulley ratio) using signal 304, module 302 may determine one or more operating modes without the need to further analyze the frequency or other characteristics of the input signals 202. Alternatively, input signals may be further analyzed to determine additional data. In the embodiment shown in FIG. 3, for example, generator speed sensing module 302 processes signal 304 to indicate RVC or RTC mode with signal 306, whereas frequency discriminator module 208 suitably indicates "normal" or "fast" mode using signal 216. In embodiments wherein either "normal" or "fast" mode are not implemented, however, either module 208 or module 302 may be eliminated as appropriate. In still further embodiments, mode selection signals (e.g. signals 266, 306) are produced by an ECM or external controller and provided to regulator 201 with input signals 202. In such embodiments, regulator 201 need not determine mode selection information, since this data is readily available from an external source.

Figure 4:
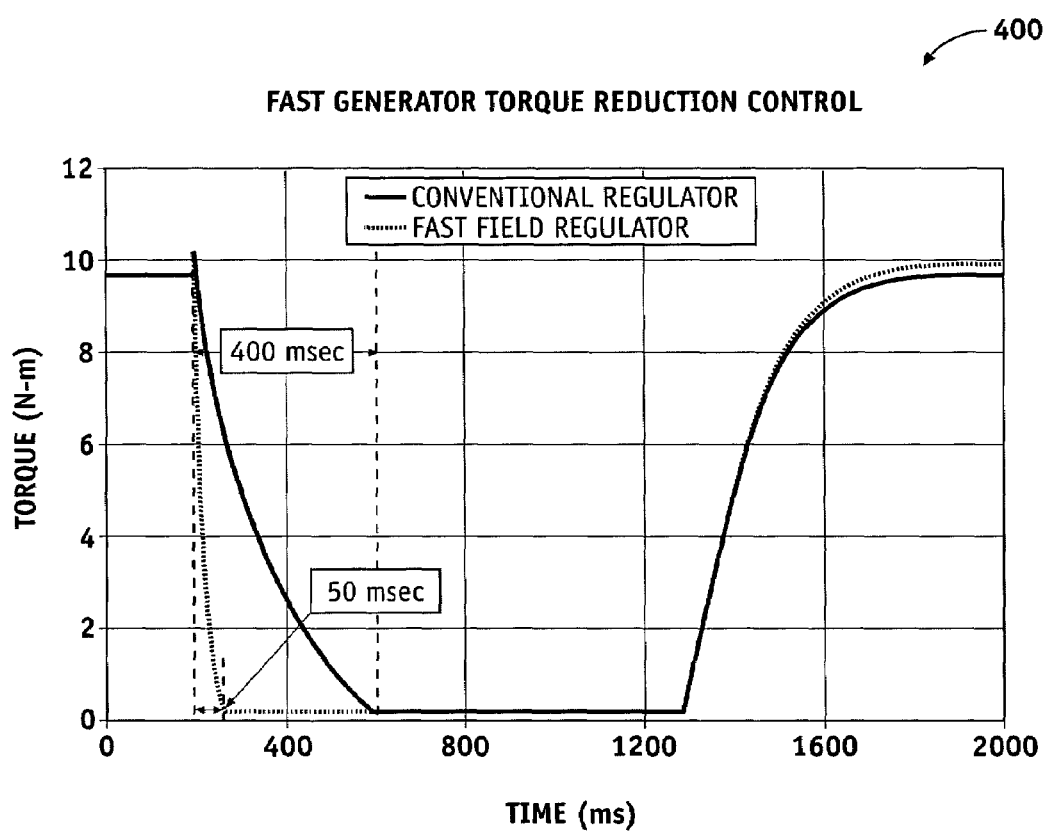
FIG. 4 is a plot of exemplary results obtainable with one embodiment of a fast torque reduction technique.

Using the various concepts set forth herein, one or more benefits may be provided to the various implementations and embodiments. With final reference to FIG. 4, significant reductions in torque response times can be realized using the concepts of torque control set forth herein. FIG. 4 shows that torque fall times have been reduced by an order of magnitude or more, thereby resulting in improved control and fewer vehicle stalls. Moreover, the concepts set forth herein can be used for more precise control over engine torque management, thereby resulting in improved fuel efficiency and emissions quality.

Although the various embodiments are most frequently described with respect to automotive applications, the invention is not so limited. Indeed, the concepts, circuits and structures described herein could be readily applied in any commercial, home, industrial, consumer electronics or other setting. The concepts described herein could similarly be readily applied in aeronautical, aerospace, marine or other vehicular settings as well as in the automotive context.

While at least one exemplary embodiment has been presented in the foregoing detailed description, a vast number of variations exist. The various circuits described herein may be modified through conventional electrical and, electronic principles, or may be logically altered in any number of equivalent embodiments without departing from the concepts described herein. Although the present disclosure frequently refers to a Lundell machine or other alternator, for example, the concepts of torque control discussed herein could be readily applied to any other type of AC or DC generator, motor or the other device having a controllable element as described herein. Accordingly, the exemplary embodiments described herein are intended only as examples, and are not intended to limit the scope, applicability, or configuration of the invention in any way. Rather, the foregoing detailed description will provide those skilled in the art with a convenient road map for implementing one or more exemplary embodiments. Various changes can therefore be made in the functions and arrangements of elements set forth herein without departing from the scope of the invention as set forth in the appended claims and the legal equivalents thereof.

What is claimed is:

1. A regulator for controlling a generator having a controllable element in response to an input signal received from a control module, the regulator comprising:
   a discriminator configured to determine whether the input signal is a voltage control or a torque control;
   a processing module configured to convert the input signal to a modulation signal using a first conversion technique if the input signal is a voltage control and a second conversion technique different from the first conversion technique if the input signal is a torque control; and
   a switching circuit configured to modulate the controllable element of the generator in response to the modulation signal to thereby control the generator.

2. A regulator for controlling a generator having a controllable element in response to an input signal received from a control module, the regulator comprising:
   a discriminator configured to determine whether the input signal is a voltage control or a torque control;
   a processing module configured to convert the input signal to a modulation signal using a first conversion technique if the input signal is a voltage control and a second conversion technique different from the first conversion technique if the input signal is a torque control; and
   a switching circuit configured to modulate the controllable element of the generator in response to the modulation signal to thereby control the generator, wherein the switching circuit comprises:
      a first switch operatively located between a first reference voltage and a first terminal of the controllable element;
      a second switch operatively located between a second reference voltage and a second terminal of the controllable element;
      a first uni-directionally conducting device operatively located between the first switch and the second reference voltage; and
      a second uni-directionally conducting device operatively located between the second switch and the first reference voltage.

3. The regulator of claim 2, wherein the discriminator is a frequency discriminator.

4. The regulator of claim 2 wherein the first and second switches are transistors.

5. The regulator of claim 4 wherein the modulation signal comprises a first portion provided to the first switch and a second portion provided to the second switch.

6. A regulator for controlling a vehicle alternator having a field coil to produce a desired voltage between a first and a second battery terminal in response to an input signal received from a control module, the regulator comprising:
   an input port configured to receive the input signal;
   a discriminator module configured to produce a mode selection signal indicating whether the input signal is a voltage control or a torque control;
   a processing module configured to convert the input signal to a first modulation signal and a second modulation signal different from the first conversion technique using a conversion routine selected in response to the mode selection signal; and
   a switching circuit configured to modulate the controllable element of the generator in response to the first and second modulation signals to thereby control the generator, wherein the switching circuit comprises:
      a first transistor operatively located between the first battery terminal and a first terminal of the field coil element and operable to couple the first terminal of the field coil to the first battery terminal in response to the first modulation signal;
      a second transistor operatively located between the second battery terminal and a second terminal of the field coil and operable to couple the second terminal of the field coil to the second battery terminal in response to the second modulation signal;
      a first diode operatively located between the first transistor and the second battery terminal; and
      a second diode operatively located between the second transistor and the first battery terminal.

7. The regulator of claim 6 wherein the switching circuit is further configured to provide a positive voltage across the field coil when the first and second transistors are active, and to provide a negative voltage across the field coil when the first and second transistors are inactive.

8. A generator assembly for a vehicle having an engine, a battery having first and second battery terminals with a battery voltage therebetween, and a control module configured to produce an input signal, the generator assembly comprising:
   an alternator configured to convert mechanical energy from the engine to electrical energy, wherein the alternator comprises a controllable element;
   a rectifier configured to convert the electrical energy from the alternator to a direct current (DC) voltage applied across the first and second battery terminals; and
   a regulator comprising:
      a discriminator configured to determine whether the input signal is a voltage control or a torque control;
      a processing module configured to convert the input signal to a modulation signal using a first conversion technique if the input signal is a voltage control and a second conversion technique different from the first conversion technique if the input signal is a torque control; and
      a switching circuit configured to modulate the controllable element of the alternator in response to the modulation signal by switchably applying the battery voltage from the first and second battery terminals to the controllable element to thereby control the generator.

9. The generator assembly of claim 8 wherein the switching circuit is further configured to temporarily reverse the polarity of the battery voltage applied across the controllable element when the input signal is a torque control.

10. The generator assembly of claim 8 wherein the switching circuit comprises:
   a first transistor operatively located between the first battery terminal and a first terminal of the controllable element and operable to couple the first terminal of the controllable element to the first battery terminal in response to the first modulation signal;
   a second transistor operatively located between the second battery terminal and a second terminal of the controllable element and operable to couple the second terminal of the controllable element to the second battery terminal in response to the second modulation signal;

a first uni-directionally conducting device operatively located between the first transistor and the second battery terminal; and a second uni-directionally conducting device operatively located between the second transistor and the first battery terminal.

11. A device for controlling a generator having a field coil in response to an input signal received from a control module, the device comprising:

means for determining whether the input signal is a voltage control or a torque control;

means for converting the input signal to a modulation signal using a first conversion technique if the input signal is a voltage control and a second conversion technique if the input signal is a torque control; and means for modulating the field coil of the generator in response to the modulation signal to thereby control the generator.

12. The regulator of claim 2, wherein the discriminator is a voltage amplitude discriminator.

13. The regulator of claim 2 wherein the first and second uni-directionally conducting devices are diodes.

* * * * *

UNITED STATES PATENT AND TRADEMARK OFFICE
CERTIFICATE OF CORRECTION

| | | |
|---|---|---|
| PATENT NO. | : 7,009,365 B1 | Page 1 of 1 |
| APPLICATION NO. | : 10/931464 | |
| DATED | : March 7, 2006 | |
| INVENTOR(S) | : Chandra S. Namuduri et al. | |

It is certified that error appears in the above-identified patent and that said Letters Patent is hereby corrected as shown below:

On the Title Page in the Inventors section, Item (75) the last name "Huazi" is replaced by --Hijazi--

Signed and Sealed this

Thirteenth Day of February, 2007

JON W. DUDAS
*Director of the United States Patent and Trademark Office*